United States Patent [19]

Zimmermann et al.

[11] 4,342,107
[45] Jul. 27, 1982

[54] PICK-UP NEEDLE

[76] Inventors: Heinrich Zimmermann, Joh. Seb. Bach. Str. 14; Jörg Schamberger, Schwarzwaldstr. 8, both of 7742 St. Georgen, Fed. Rep. of Germany

[21] Appl. No.: 191,464

[22] Filed: Sep. 26, 1980

[51] Int. Cl.³ .............................................. G11B 3/02
[52] U.S. Cl. .................................... 369/172; 369/137
[58] Field of Search ............... 369/137, 138, 169, 170, 369/171, 172, 140

[56] References Cited

U.S. PATENT DOCUMENTS

| 3,294,405 | 12/1966 | Pritchard | 369/171 |
| 3,523,690 | 8/1970 | Vandekoppel | 369/171 |
| 3,699,268 | 10/1972 | Miller | 369/170 |
| 4,075,418 | 2/1978 | Nemoto et al. | 369/170 |

FOREIGN PATENT DOCUMENTS

| 1447146 | 1/1969 | Fed. Rep. of Germany | 369/171 |
| 111712 | 3/1965 | Netherlands | 369/170 |

Primary Examiner—John W. Shepperd
Attorney, Agent, or Firm—Martin A. Farber

[57] ABSTRACT

Pick-up needle having a cantilever lying in the longitudinal direction of the cartridge, which cantilever carries the tracking stylus point at one end and is coupled at a slight distance therefrom to an electro-mechanical transducer and is otherwise supported in a holding part which is held to the cartridge by a clamping device, and having guides for defining its feed movement relative to the cartridge upon change of the needle, namely in a direction which is first lengthwise of the cartridge and then transverse thereto.

3 Claims, 5 Drawing Figures

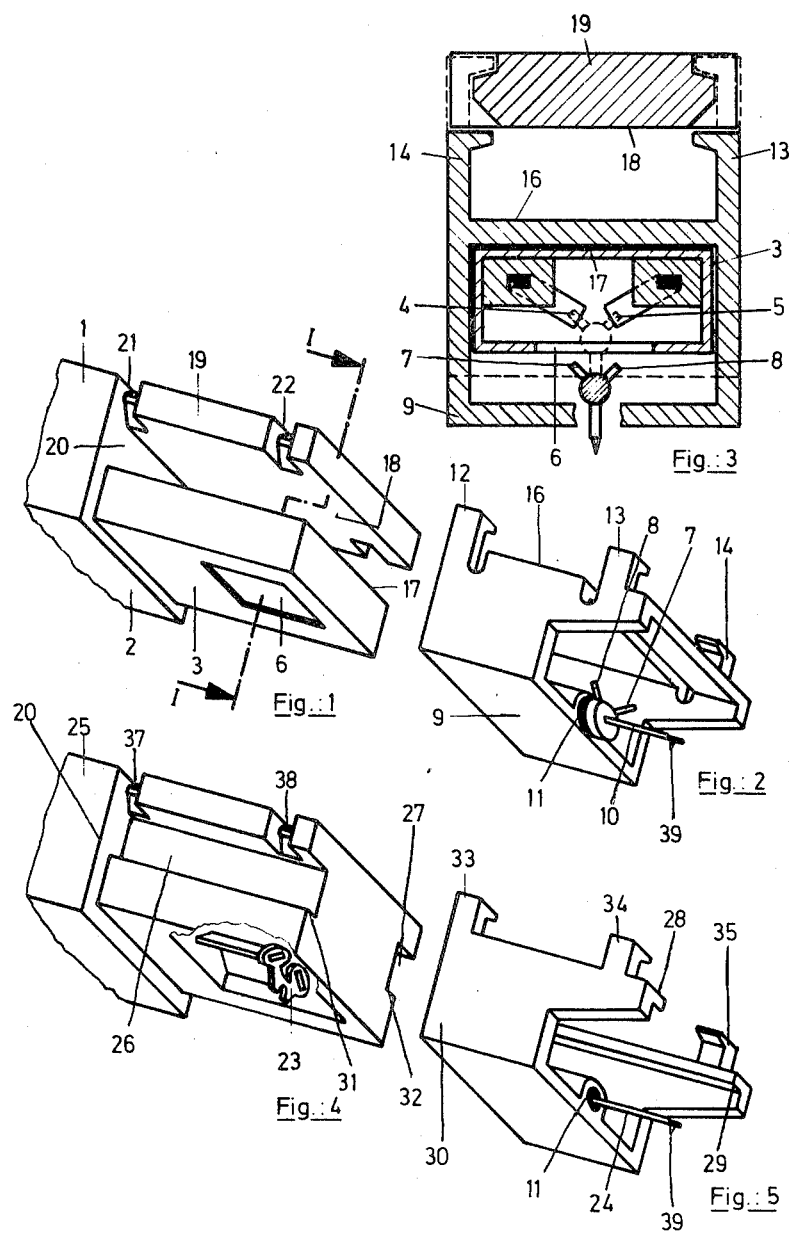

PICK-UP NEEDLE

The present invention relates to a replaceable pick-up or cartridge needle which contains a needle arm (cantilever) which lies substantially in the longitudinal direction of the pick-up (cartridge), carries the stylue point at one end, is coupled on its remaining length to at least one electro-mechanical transducer and is furthermore elastically mounted in a holding part which, for purposes of easy replaceability of the needle, is held by a clamping device on the pick-up housing (cartridge), the clamping device entering into action upon the movement of bringing the needle to its operating position, this movement being substantially transverse to the longitudinal axis of the pick-up.

Pick-up needles with replacement movement directed transverse to the longitudinal axis of the pick-up are used when it is advantageous or necessary to bring the needle-carrier arm to the place which establishes connection with the electro-mechanical transducer in is not sufficient to obtain the correct position for the needle of pick-ups with ceramic transducers, since otherwise, in case of a longitudinal displacement, the elastic coupling part between the transducer and the needle arm would be clamped in the longitudinal direction of the needle arm. In the case of magnetic systems which have an air gap which is accessible only in a transverse direction, a corresponding replacement movement of the needle is necessary, unless one is willing to tolerate also replacing a part of the magnet poles.

Since a turntable pick-up needle is a relatively small and sensitive article which is seated at a point of the turntable which is not conveniently accessible and furthermore replacement is to be possible preferably by the use of the turntable itself, a large number of arrangements for solving this difficult problem have become known, none of which, however, is as yet satisfactory. One relatively simple principle of solution consists, for instance, in developing the holding part of the needle in U-shape and pushing its U-shaped arms from below over the housing of the pick-up, the U-shaped arms in addition to their holding force also providing a certain guidance (West German Provisional Patent No. AS 11 12 840, Utility Model Gbm No. 17 89 402). The disadvantage of such an arrangement is that on the one hand it cannot be readily noted where the holding part is to be seated since the guide means on the housing can consist only of relatively flat recesses and the housing furthermore as a rule consists of a single-colored plastic part which for aesthetic reasons is furthermore preferably black. On the other hand, the guide for the insertion movement is relatively short so that it does not compel the desired feed movement immediately upon the first attempt at attachment in the region of the coupling point of the transducer (tilted seat). It is not sufficient that the needle be imparted the correct position after many attempts. By that time damage may have been produced or, insofar as a piezoelectric transducer is concerned, the coupling part may have been imparted at least a position clamped or deformed in front or at the rear. It is also disagreeable at times that the needle must be pulled off forceably in order to overcome its holding force, which is frequently considerable due to the small spring paths. The sudden force release upon the loosening of the needle can lead to uncontrolled movements which may lead to damage, in particular, when the pick-up remains in the arm upon the replacement of the needle, as is desirable.

Another known solution (West German Unexamined Application OS No. 14 72 048) resides in the fact that the holding part is brought up by a tilting movement in the manner that its rear part is first of all introduced obliquely behind a protrusion of the cartridge housing and its front part is then lifted against the housing, where it then engages. The advantage of this arrangement over the one described above is that the position of the holding part is determined more unambiguously with respect to the longitudinal direction of the pick-up upon attachment since it must be brought definitely against a stop surface. The alignment with the longitudinal axis of the pick-up is also, to be sure, easier due to a longitudinal recess in the housing and can in itself be easily noted visually, but the longitudinal recess necessarily lies on the bottom of the housing so that its rear end, at least, cannot be readily noted.

Both of the above-mentioned solutions in particular have the disadvantage that the holding part must be held or guided by both fingers when being fed into its operating position until shortly before reaching that position, in which connection there is frequently the further aggravating factor that due to the limited possibility of lift of the tone arm, the attachment movement must take place transversely to the longitudinal direction of the fingers.

For pick-ups of the type not of concern herein there are known needle mounts which do not have the aforementioned disadvantages. In this connection magnetic pick-ups are of concern, the air gaps of which are accessible in the longitudinal direction of the pick-ups so that the needle-armature unit is fed in this direction (West German Unexamined Application Patent OS 21 59 573). Such mounts, however, cannot be used for the needles or pick-ups concerned here.

The object of the invention is to facilitate the replacement of the needle and to increase the assurance against the danger of damaging the pick-up. This purpose is achieved by the invention with a device of the introductory mentioned type, in the manner that guides define the feed movement of the needle relative to the pick-up cartridge upon change of the needle, namely in a direction which is first lengthwise of the pick-up cartridge and then transverse thereto, respectively.

The solution in accordance with the invention is based on a new method of changing the needle insofar as its feed movement takes place in two constrained directions, the initial direction lying in the longitudinal direction of the pick-up cartridge, as has in itself proven satisfactory in the case of other pick-ups of a type not concerned with here. This part of the feed movement is, however, used only to bring the needle into a given intermediate position (i.e., the abutment end position of the initial longitudinal feed mount) in which it is self held, and from where the actual attachment movement directed perpendicular thereto (the transverse feed movement), takes place, which actual attachment movement can then be effected by mere pressure by a single finger without any visual aid in orientation.

With the above and other objects and advantages in view, the present invention will become more clearly understood in connection with the detailed description of preferred embodiments, when considered with the accompanying drawing, of which:

FIG. 1 is a perspective view of a magnetic cartridge without the replaceable needle-armature unit;

FIG. 2 shows the corresponding needle-armature unit in perspective view;

FIG. 3 is a sectional view through the pick-up cartridge of FIG. 1 along the line I—I, also showing the needle-armature unit being longitudinally inserted into the cartridge;

FIG. 4 is a perspective view of another embodiment of a ceramic cartridge without showing a needle; and FIG. 5 shows the corresponding needle unit for the cartridge of FIG. 4.

The housing or cartridge 1 of the magnetic pick-up shown in FIGS. 1 to 3 is made of a plastic part 2 from which there extends a sheet metal shield 3 in which the pole shoes 4, 5 of the magnetic circuits of two transducer systems for the playback of stereophonic recordings are located. They are accessible for the introduction of the magnetic armatures 7, 8 from below through an opening 6 in the bottom of the shield 3. The corresponding needle-armature unit (FIG. 2) comprises a holding part 9 to which a needle arm (cantilever) 10 is fastened by means of an elastic bearing 11. The two magnetic armatures 7, 8 of the two transducer systems are fastened to the needle arm 10. The holding part 9 has the shape of a rectangular tube from which four spring arms 12 to 14 project upwardly. The inner cross-section of the holding part 9 is complementarily adapted to the outer shape of the shield 3, with the exception of its height. If the holding part 9 is pushed onto the shield 3, it lies with its upper wall 16 on the upper part 17 of the shield 3. The resilient spring arms 12 to 14 of the holding part 9 slide in this connection on the bottom 18 of a housing projection 19 so that no movement of the holding part 9 is possible in any direction which is transverse to the longitudinal axis of the pick-up cartridge so that the small sensitive armatures 7, 8 cannot strike against anything. In the end position of the feed movement of the needle, which takes place lengthwise of the pick-up cartridge, which end position is determined by the spring arm 12 coming against a stop 20 on the cartridge, the spring arms 12 to 14 come into alignment with recesses 21, 22 in the pick-up cartridge 1 which for the spring arms 12 to 14, and thus for the entire needle-armature unit 9, upon pressure from below, provide exclusive guidance in the direction perpendicular to the longitudinal axis of the pick-up, whereby the two armatures 7, 9 pass, without any danger of damage, into their operating position. In this operating position the two armatures 7, 8 are held by the spring force of the spring arms 12 to 14.

In the case of the ceramic pick-up cartridge shown in FIG. 4, the coupling means 23 for the coupling of the needle arm (cantilever) 24 to the transducer elements extend in customary manner out of the bottom of the pick-up housing or cartridge 25. The pick-up housing 25 contains laterally two longitudinal grooves 26, 27 which serve to receive guide ledges 28, 29 which are arranged on a U-shaped holding part 30 for the needle arm 24. When the needle holding part 30 (FIG. 5) is pushed onto the pick-up housing 25 these guide ledges 28, 29 lie on the lower slide path 31, 32 of the longitudinal grooves 26, 27 of the housing. The length of the spring arms 33 to 35 corresponds approximately to the width of the longitudinal grooves 26, 27 of the pick-up housing 25 so that only movement in the longitudinal direction is possible, in which connection the needle arm 24 can move unimpeded past the coupling part 23. Here also a vertical feed movement is made possible only at the end of the longitudinal insertion by the spring arms 33 to 35 coming into alignment with corresponding guide recesses 37, 38 in the housing 25 of the pick-up. Then by pressure from below the needle arm 24 can be brought into engagement with the coupling member 23 without being clamped or deformed at the front or at the rear.

I claim:

1. A replaceable pick-up needle for a pick-up for the tracking of records, the pick-up containing an electro-mechanical transducer, comprising a cartridge (1, 25), a cantilever (10, 24) being substantially disposed in the longitudinal direction of the cartridge, a stylus point (39) disposed at an end of said cantilever (10, 24), connection means to the cantilever (10, 24) for transmitting the tracking movement of the cantilever (10, 24) to the electro-mechanical transducer in the pick-up, an elastic bearing means (11) for holding said cantilever (10, 24) swingable in all directions at a point which is spaced from said stylus point (39), means comprising a holding part (9, 30) for receiving said elastic bearing means (11) of the cantilever (10, 24), a clamp fastening means for detachably holding said holding part (9, 30) in an operating position on said cartridge (1, 25), longitudinal guide means (3, 19, 9; 26, 28, 27, 29) for guiding said holding part in a direction of feed movement of said holding part (9, 30) relative to said cartridge (1, 25) in a direction substantially parallel to a longitudinal axis of the cartridge, stop means (20) for limiting said feed movement of the holding part (9, 30) and defining an abutment end position thereof, transverse guide means (21, 12, 22, 13; 33, 37, 34, 35, 38) for guiding said holding part in a feeding movement of said holding part (9, 30) into said operating position on said cartridge (1, 25) in a direction which is substantially transverse to said longitudinal axis of said cartridge beginning at the abutment end position of the feed movement of the holding part in the longitudinal direction of the cartridge.

2. The replaceable pick-up needle according to claim 1, wherein said longitudinal guide means (3, 19, 9; 26, 28, 27, 29) constitute prismatic guide portions which extend over a substantial part of the length of said cartridge (1, 25).

3. The replaceable pick-up needle according to claim 1, comprising spring arms (12 to 14; 33 to 35) arranged opposite each other with respect to the longitudinal direction of the cartridge, said spring arms project transversely on said holding part, said cartridge (1, 25) is formed with recess means for guiding said spring arms (12 to 14; 33 to 35) of said holding part (9, 30) transversely to said longitudinal axis, said recess means are arranged in alignment with said spring arms (12 to 14; 33 to 35) when said holding part is at the end of said feed movement in the longitudinal direction of the cartridge, said end of said feed movement is said abutment end position, and said spring arms and said recess means at least constitute said transverse guide means.

* * * * *